March 13, 1951 W. H. WORTHINGTON ET AL 2,544,972
VALVE MECHANISM FOR HYDRAULIC UNITS
Original Filed Aug. 4, 1944
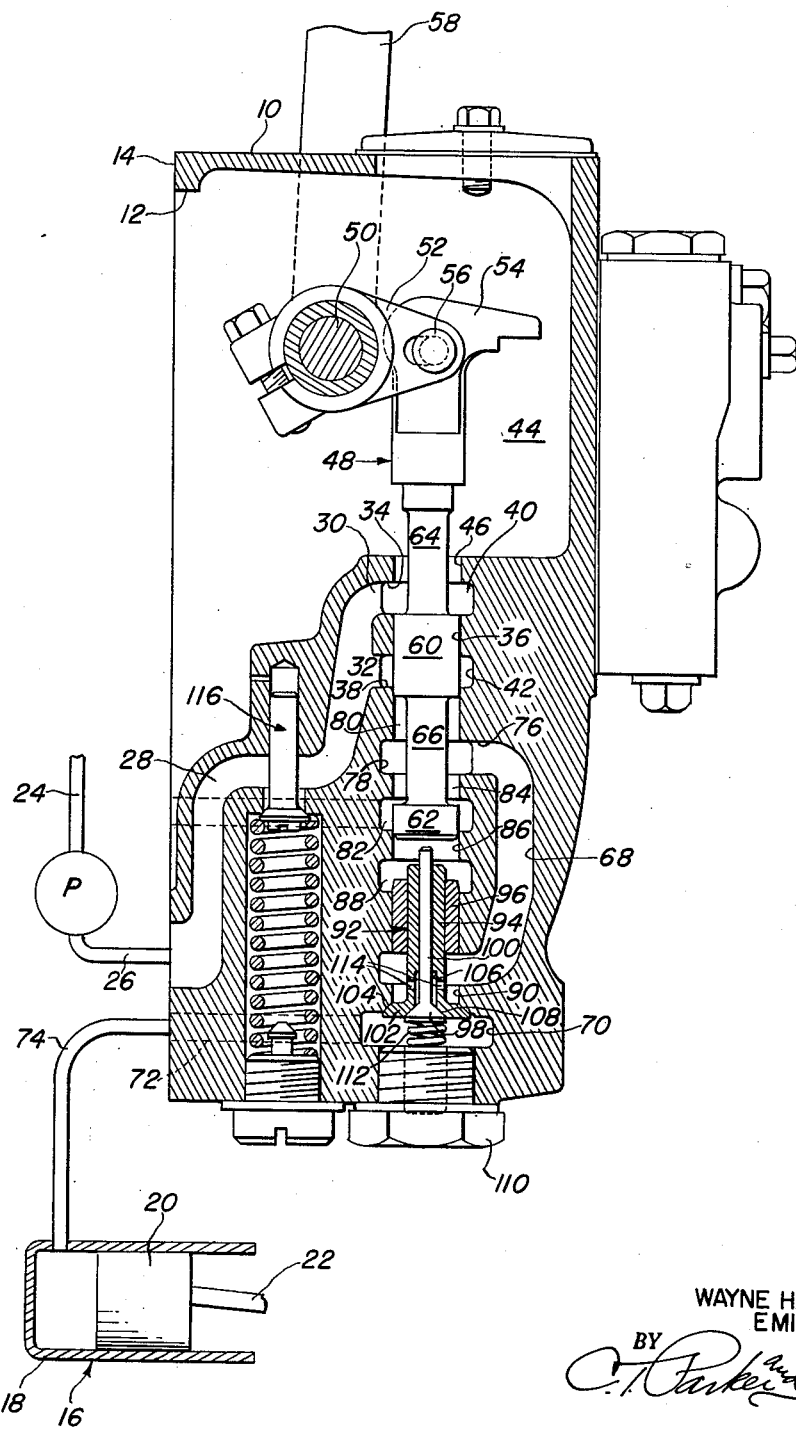
INVENTORS
WAYNE H. WORTHINGTON
EMIL F. JIRSA
BY
ATTORNEYS Patented Mar. 13, 1951

2,544,972

UNITED STATES PATENT OFFICE 2,544,972

VALVE MECHANISM FOR HYDRAULIC UNITS

Wayne H. Worthington and Emil F. Jirsa, Waterloo, Iowa, assignors to Deere Manufacturing Co., a corporation of Iowa Original application August 4, 1944, Serial No. 548,086, now Patent No. 2,462,246, dated February 22, 1949. Divided and this application February 14, 1949, Serial No. 76,242

8 Claims. (Cl. 277—53)

This invention relates to valve mechanism for a hydraulic power unit and is adapted primarily for the purposes of improving hydraulic systems of the type used on agricultural tractors in connection with the power adjustment of implements and machines used with such tractors.

The present application is a division of our co-pending application, Serial No. 548,086 filed August 4, 1944, issuing February 22, 1949, as U. S. Patent No. 2,462,246.

In a typical hydraulic power unit for use with an agricultural tractor, as referred to above, the unit is built into the tractor and includes a fluid motor such as a cylinder and piston to which fluid is supplied by means of a pump driven by some part of the power train of the tractor. The distributing valve for controlling the transmission of fluid pressure to and from the motor conventionally takes the form of a casing appropriately associated with that portion of the tractor into which the unit is built. This casing carries a control shaft on which is mounted a lever or other means convenient to the tractor operator. It is desired that the distributing valve be operative to give the operator the widest choice of positions to and from which he may adjust his implement. Accordingly, it is desirable that the piston be movable in its cylinder in either direction and further that the piston be lockable in any particular position in the cylinder, all under control of the distributing valve.

Since the primary function of a power unit on an agricultural tractor is to raise and lower implements used with the tractor, reference will be had to operation of the unit in connection with such raising and lowering functions; although, it will be understood that other adjustments of implements may be effected by the fluid motor. In accordance with the foregoing, it is a principal object of the invention to provide an improved distributing valve mechanism including a valve member so arranged with respect to fluid inlets and discharge passages as to effect raising or lowering of an agricultural implement and to permit readjustment of the implement from any one of its positions without going through a complete raising or lowering cycle; that is to say, so that an implement may be partly raised, for example, and then may be further raised or even lowered. With respect to this object of the invention, we provide a high-pressure fluid passage having ports open respectively to the reservoir and to the motor and incorporate in the motor port a check valve which may be opened by high pressure while the discharge port is closed and which may be opened by the reciprocal valve member so that fluid may return from the motor through an appropriate discharge port to the reservoir.

An important object of the invention resides in the provision of an improved check valve which involves a pair of valve members, one within the other, and one of which is opened before the other, thereby enabling the check valve to be manually opened against pressure with a minimum of effort. Further in this respect, it is an object of the invention to provide for sequential operation of the two check valve members by means of the main control or by-pass valve, whereby said valve and the check valve are operable in sequence.

The foregoing and other important objects and desirable features of the invention will become apparent to those skilled in the art as the disclosure is completely made in the following detailed description and accompanying sheet of drawings in which the single figure is a combined sectional and schematic view illustrating the distributing valve, a source of fluid pressure, and a fluid motor.

Inasmuch as the present case is concerned primarily with the distributing valve, including the improved by-pass and check valve structures, various other components of the complete unit have not been illustrated and will not be described. However, reference may be had to the patent identified above for a full disclosure of details not of primary importance here.

The numeral 10 is used to designate a distributing valve casing which is open at 12 and provided with a mounting surface 14 for mounting of the casing on a tractor in association with other hydraulic power unit components as illustrated in the patent identified above. The opening 12, as will be apparent in that patent, communicates with the fluid reservoir of the system.

There has been schematically illustrated here a fluid motor 16 comprising a cylinder 18 and a piston 20. In a conventional construction, the fluid motor would be provided as an integral or closely associated part of a tractor equipped with the complete unit. The piston has connected thereto a piston rod 22 which is connected to the load to be moved; in the conventional case an implement is connected to the tractor and is operated by means including a rockshaft and lever connected to the piston rod, all of which may be of any suitable design or may follow the illustration of constructions heretofore known, including that in our patent identified above.

Also illustrated schematically is a source of fluid pressure, here shown as a pump P having a fluid intake 24, connected to the reservoir (not shown) of the system, and a high-pressure conduit 26. The casing 10 is appropriately cored or otherwise provided with a high-pressure or supply passage 28 connected directly to the high-pressure conduit 26. Within the casing 10, the high-pressure passage 28 is provided with two branches 30 and 32. The passage branch 30 opens through an outlet port or opening 34 to a vertical valve bore 36 in the casing 10. The passage branch 32 likewise opens to the valve bore 36, via an outlet port or opening 38. The bore 36 is enlarged annularly at 40 and 42, respectively, in alignment with the ports 34 and 38.

The casing 10 is hollow at 44 and thus communicates through the opening 12 to the reservoir of the system. The valve bore 36 opens upwardly through a discharge port 46 to this hollow portion 44, the latter providing, in effect, the reservoir or a part thereof. The port 46 is of the same diameter as the main part of the bore 36 so that a by-pass valve, designated generally by the numeral 48, may be freely axially reciprocal in the bore.

The by-pass valve member 48 is part of by-pass means including the by-pass valve, the bore 36, the ports 34, 38 and 46, and other ports to be presently described. This valve member is operable in the casing to control the position of the piston 20 in the cylinder 18. Manual control of the valve 48 is accomplished by means including a rockshaft 50, an operating arm 52 affixed thereto, and a connecting member 54 articulately connected at 56 to the arm 52. The rockshaft 50 may have connected thereto an operating lever 58, the specific details of which may be of any suitable design.

The valve member 48 includes a first portion 60 and a second portion 62, both of which are preferably of the same diameter and both of which are slidably receivable in the bore 36. That portion of the valve 48 between the portion 60 and the connecting member 54 is reduced, as at 64, to provide for discharge of fluid through the passage branch 30, the port 34, and the port 46 when the valve member is in the position illustrated. Another portion of the valve member is reduced at 66 between the portions 60 and 62, to provide for communicating the high-pressure passage 28 through the passage branch 32 and port 38 with a conduit 68 which is ultimately fluid-connectible to a motor or cylinder port 70. The port 70 is directly connected by a passage 72, cored or otherwise provided in the casing 10, which is in turn in communication with one end of the fluid motor 16 via a fluid passage or conduit 74. In an integral system of the type referred to, the passages or conduits 24, 26 and 74 would be cored in castings comprising integral or associated parts of the unit. For the present purposes, the schematic illustration is deemed sufficient to illustrate the relationship between the pump P, the motor 16 and the distributing valve included in the casing 10.

The upper portion of the passage or conduit 68 communicates with the valve bore 36 through a port 76 and an annular chamber 78 which is somewhat larger in diameter than the valve bore 36. The annular chambers 42 and 78 are thus axially spaced apart in the bore 36 and may be placed in fluid-communication through a portion of the bore designated by the numeral 80. The annular chamber 78 is further at times in fluid-communication with another annular chamber 82 through a portion of the bore designated by the numeral 84. In the position of the valve 48 as shown, the chamber 82 substantially surrounds the lower valve portion 62, which portion is received in a bore portion indicated by the numeral 86. The bore portion 86 opens into an enlarged annular chamber 88 spaced axially below the annular chamber 82. Inasmuch as the annular chambers 40, 42, 78, 82 and 88 are coaxial on the axis of the bore 36, they are likewise coaxial with the motor port 70.

The lower end of the passage or conduit 68 communicates with the port 70 by means of a port 90 which is controlled by a check valve 92. Since the port 70 is at times fluid-connected to the high-pressure passage 28, the port 70 may be spoken of as a discharge port through which fluid is transmitted or discharged to the motor 16, the port 70 being selectively utilized alternately with the discharge port 46 at the upper end of the valve bore, depending upon whether fluid is transmitted to the motor 16 or is merely circulated at no appreciable pressure through the port 46 to the reservoir.

The check valve 92 includes a first valve member 94 disposed coaxially with the by-pass valve 48 and slidably carried by a bearing 96. The check valve member 94 is drilled axially or otherwise formed hollow to receive a second check valve member 98, which has a stem 100 extending slidably through the check valve member 94 into proximity to the lower portion 62 of the valve 48.

Communication between the ports 70 and 90 is controlled mainly by the larger check valve member 94, which has a head 102 cooperative with a valve seat 104 between the ports 70 and 90. The lower portion of the bore provided in the check valve member 94 is enlarged to provide a chamber 106 which opens through the head 102 of the member 94 as a seat 108 for the head of the second valve member 98.

The bottom of the casing 10 is drilled in axial alignment with the valve bore 36 and is internally threaded to receive a plug 110 which serves to retain yieldable means, such as a compression spring 112, for holding the check valve 92 in closed position. It will be noted that the spring 112 acts against the headed end of the second valve member 98. Since this end of the valve member 98 seats on the seat 108 of the first or larger valve member 94, the same spring operates to hold the head 102 of the member 94 on the seat 104. Cooperation between the head 102 and seat 104 provides stop means for limiting movement of the member 94 toward the by-pass valve 48. Similarly, engagement between the head of the second valve member 98 and the seat 108 of the larger valve member 92 provides stop means for limiting movement of the valve member 94 away from the by-pass valve 48.

Fluid passage means is provided between the conduit or passage 68 and the inner or smaller valve member 98, part of this means comprising a pair of orifices 114 and the annular chamber 106 referred to above. This fluid passage means is closely adjacent the headed end of the valves 94 and 98 and is substantially within the confines of the valve seat including the portions 104 and 90.

The valve casing or housing 10 is provided with a pressure-relief valve, designated generally by the numeral 116, the construction of which may be of any suitable design other than that illustrated and the purpose of which is as usual. Since the relief valve forms no part of the system in so far as the present invention is concerned, only brief reference is had thereto.

Operation

Having reference to the function of the power unit for the raising and lowering of an agricultural implement, the various positions assumed by the by-pass valve 48 will be hereinafter designated as "lower," "hold" and "raise." The position of the valve shown in the drawings is its "hold" position. In this position of the by-pass valve 48, the portion 60 blocks the bore portion 80 but fluid-connects the high-pressure passage 28 and discharge port 46 through the passage branch 30 and port 34; thus, fluid circulates at no appreciable pressure between the pump and reservoir. The lower end portion 62 of the valve 48 is spaced above the stem 100 of the check valve; consequently, the spring 112 is holding the check valve closed. The piston 20 of the motor 16 is indicated at an intermediate position. Fluid trapped in the left-hand end of the cylinder 18, in the passages 72 and 74 and port 70, cannot escape through the closed check valve. Therefore, the piston will be held in the position indicated—or any other position in which similar conditions obtain.

When it is desired to effect movement of the piston 20 to the right, for the purposes of "raising" an implement connected to the piston rod 22, the operating lever 58 will be rocked in a counterclockwise direction so as to raise the valve 48. The portion 60 on the valve 48 now moves up and blocks the discharge port 46 and communicates the inlet port 38 of the high-pressure passage branch 32 with the passage 68 via the bore portion 80 and port 76; simultaneously, the lower portion 62 on the valve 48 blocks the bore portion 84. The rise in pressure in the fluid-pressure passage now established effects opening of the complete check valve 92 against the pressure of the spring 112, and more fluid pressure is transmitted to the motor 16. When the desired position of the piston 20 has been obtained, the valve 48 may be moved again to the position illustrated and "holding" action will be effected.

Movement of the piston 20 to the left in the cylinder 18 for the purpose of "lowering" the implement is effected by rocking of the control lever 58 in a clockwise direction so as to cause movement of the valve 48 downwardly in the valve bore 36. This downward movement of the valve 48 leaves the high-pressure passage 28 and discharge port 46 in fluid-communication through the passage branch 30 and port 34. However, the valve portion 60 continues to block the bore portion 80 so that fluid under pressure from the passage branch 32 does not enter the chamber 78 for transmission through the port 76 to the passage 80. Downward movement of the valve 48 also effects engagement between the lower end valve portion 62 and the upper end of the stem 100 on the inner or smaller check valve member 98. Initial movement of the stem 100 by downward movement of the valve 48 first unseats the headed end of the inner check valve member 98 from the seat 108, whereupon fluid from the left hand end of the motor may return through the fluid passage comprising the chamber 106 and orifices 114, to enter the passage 68 for return to the reservoir through the port 76, chamber 78, valve bore portion 84 and reservoir port 82, the latter being connected to the reservoir as indicated by the dotted line in the drawings. The admission of a small amount of fluid through the passage means just described relieves somewhat the pressure on the complete check valve, with the result that further movement of the valve member 48 to accomplish opening of the check valve assembly is made relatively easier; or, in other words, minimizes the effort necessary to be expended by the operator. Complete downward movement of the valve 48 completely opens the check valve 92 and communicates the port 70 with the port 90 through the seat 104. In the event that it is not desired to effect movement of the piston 20 completely to the left, any intermediate position of the piston may be secured by return of the valve 48 to the position indicated in the drawings, whereupon the valve occupies its "hold" position.

Summary

It will be appreciated from the foregoing that we have provided an improved valve mechanism for the operation of a hydraulic unit of the type described. Other features and important objects not specifically enumerated will undoubtedly occur to those versed in the art, as likewise will numerous modifications and alterations in the preferred construction illustrated, all of which may be accomplished without departure from the spirit and scope of the invention as defined in the appended claims.

What is claimed is:

1. A valve mechanism for a hydraulic power unit including a casing formed with a high pressure fluid passage having a fluid discharge port at its terminal end and a fluid port intermediate its ends, said mechanism including a reciprocally movable by-pass valve for controlling the flow of fluid through said discharge port, a check valve for controlling the flow of fluid through said intermediate port arranged in coaxial alignment with said by-pass valve, said check valve including a pair of cooperating valve members relatively arranged and constructed to close said intermediate port, with one of said valve members adapted to be opened relative to the second one of said valve members to partially open said intermediate port, means acting on said one valve member to yieldably maintain said two valve members in closed positions, and means on said check valve engageable with said by-pass valve, on movement of said by-pass valve in one direction to open said discharge port, such that said one valve member is opened prior to any opening movement of said second valve member.

2. A valve mechanism for a hydraulic power unit including a casing formed with a high pressure fluid passage having a fluid discharge port at its terminal end and a fluid port intermediate its ends, said mechanism including a reciprocating by-pass valve for controlling the flow of fluid through said discharge port arranged in a coaxial relation with said intermediate port, a check valve for controlling the flow of fluid through said intermediate port having a stem member engageable by said by-pass valve, a first valve member mounted in a spaced relation about said stem member for movement axially thereof, a seat portion on said first valve member adapted for seating engagement with a seat portion formed about said intermediate port, said first valve member having fluid passages formed therein within the confines of said seat portion thereon to fluid connect said intermediate port with the space between said stem member and said first valve member, a second valve member on said stem member formed with a seat portion engageable with said first valve member to close one end of the space formed between said stem and first valve member, said second valve member constituting a stop for limiting the movement of said first valve member away from said by-pass valve, yieldable means acting on said second valve member to maintain said two valve members in a seated relation, and said first valve member seated relative to said intermediate port, and means for reciprocating said by-pass valve to relatively control the flow of fluid through said discharge and intermediate ports, said by-pass valve on movement thereof to engage and move said valve stem, providing for the opening of said second valve member prior to any opening movement of said first valve member.

3. A valve mechanism for a hydraulic power unit including a casing formed with a high pressure fluid passage having a fluid discharge port at its terminal end and a fluid port intermediate its ends, said mechanism including a reciprocating by-pass valve for controlling the flow of fluid through said discharge port arranged in a coaxial relation with said intermediate port, a check valve for controlling the flow of fluid through said intermediate port having a stem member engageable by said by-pass valve, a first valve member mounted in a spaced relation about said stem member for movement axially thereof, a seat portion on said first valve member adapted for seating engagement with a seat portion formed about said intermediate port, said first valve member having fluid passages formed therein within the confines of said seat portion thereon to fluid connect said intermediate port with the space between said stem member and said first valve member, means on one of the members for limiting the movement of said first valve member toward said by-pass valve, a second valve member on said stem member formed with a seat portion engageable with said first valve member to close one end of the space formed between said stem and first valve member, said second valve member constituting a stop for limiting the movement of said first valve member away from said by-pass valve, yieldable means acting on said second valve member to maintain said two valve members in a seated relation, and said first valve member seated relative to said intermediate port, and means for reciprocating said by-pass valve to relatively control the flow of fluid through said discharge and intermediate ports, said by-pass valve on movement thereof to engage and move said valve stem, providing for the opening of said second valve member prior to any opening movement of said first valve member.

4. A valve mechanism for a hydraulic power unit including a casing formed with a high pressure fluid passage having a fluid discharge port at its terminal end and a fluid port intermediate its ends, said mechanism including a reciprocating by-pass valve for controlling the flow of fluid through said discharge port arranged in a coaxial relation with said intermediate port, a check valve for controlling the flow of fluid through said intermediate port having a stem member engageable by said by-pass valve, a first valve member mounted in a spaced relation about said stem member for movement axially thereof, a seat portion on said first valve member adapted for seating engagement with a seat portion formed about said intermediate port, said first valve member having fluid passage means formed therein closely adjacent to said seat portion thereon to fluid connect said intermediate port with the space between said stem member and said first valve member, means on one of the members for limiting the movement of said first valve member toward said by-pass valve, a second valve member on said stem member formed with a seat portion engageable with said first valve member to close one end of the space formed between said stem and first valve member, said second valve member constituting a stop for limiting the movement of said first valve member away from said by-pass valve, yieldable means acting on said second valve member to maintain said two valve members in a seated relation, and said first valve member seated relative to said intermediate port, and means for reciprocating said by-pass valve to relatively control the flow of fluid through said discharge and intermediate ports, said by-pass valve on movement thereof to engage and move said valve stem, providing for the opening of said second valve member prior to any opening movement of said first valve member.

5. A valve mechanism for a hydraulic power unit including a casing formed with a high pressure fluid passage having a fluid discharge port at its terminal end and a fluid port intermediate its ends, said mechanism including a reciprocating by-pass valve for controlling the flow of fluid through said discharge port arranged in a coaxial relation with said intermediate port, a check valve for controlling the flow of fluid through said intermediate port having a stem member engageable by said by-pass valve, a first valve member mounted in a spaced relation about said stem member for movement axially thereof, a seat portion on said first valve member adapted for seating engagement with a seat portion formed about said intermediate port, said first valve member having fluid passage means formed therein closely adjacent to said seat portion thereon to fluid connect said intermediate port with the space between said stem member and said first valve member, means on one of the members for limiting the movement of said first valve member toward said by-pass valve, a second valve member on said stem member formed with a seat portion engageable with said first valve member to close one end of the space formed between said stem and first valve member, means on one of said members constituting a stop for limiting the movement of said first valve member away from said by-pass valve, yieldable means acting on said second valve member to maintain said two valve members in a seated relation, and said first valve member seated relative to said intermediate port, and means for reciprocating said by-pass valve to relatively control the flow of fluid through said discharge and intermediate ports, said by-pass valve on movement thereof to engage and move said valve stem, providing for the opening of said second valve member prior to any opening movement of said first valve member.

6. A valve mechanism for a hydraulic power unit including a casing formed with a high pressure fluid passage having fluid inlet port means and fluid discharge port means, said casing further having a fluid port communicable with said passage intermediate the inlet port means and the discharge port means, said mechanism including a reciprocally movable by-pass valve for controlling the flow of fluid through the discharge port means, a check valve for controlling the flow of fluid through said intermediate port arranged in coaxial alinement with said by-pass valve, said check valve including a pair of cooperating valve members relatively arranged and constructed to close said intermediate port, with one of said valve members adapted to be opened relative to the second one of said valve members to partially open said intermediate port, means acting on said one valve member to yieldably maintain said two valve members in closed position, and means on said check valve engageable with said by-pass valve, on movement of said by-pass valve in one direction to open said discharge port means, such that said one valve member is opened prior to any opening movement of said second valve member.

7. For a hydraulic power unit having a casing provided with a valve bore, a motor port coaxial with one end of the valve bore, fluid passage means connected between the valve bore and the motor port, and an exhaust port communicable with the valve bore: valve mechanism comprising first valve means for controlling communication between the passage means and the exhaust port, including a valve selectively shiftable axially in a first direction in the valve bore to effect communication between the passage means and the exhaust port, or shiftable axially in the opposite or second direction to block off the passage means from the exhaust port; second valve means for controlling flow of fluid to or from the passage means and through the motor port, including a dual check valve coaxial with the first valve means and having a pair of cooperating valve members relatively arranged and constructed to normally close the motor port, one of said valve members being movable relative to the other to partly open the motor port; means acting on said one valve member to yieldably maintain both valve members in closed position with respect to the motor port; and means on the second valve means engageable by the first valve means, upon movement of said first valve means in the aforesaid first direction, for effecting opening of said one valve member prior to and followed by opening of the other of the valve members.

8. For a hydraulic power unit having a casing provided with a valve bore, a port coaxial with one end of the valve bore, and fluid passage means connected between the valve bore and the port: valve mechanism comprising first valve means for controlling communication between the passage means and the valve bore, including a valve selectively shiftable axially in a first direction in the valve bore to effect communication between the passage means and the valve bore, or shiftable axially in the opposite or second direction to block off the passage means from the valve bore; second valve means for controlling flow of fluid to or from the passage means and through the port, including a dual check valve coaxial with the first valve means and having a pair of cooperating valve members relatively arranged and constructed to normally close the port, one of said valve members being movable relative to the other to partly open the port; means acting on said one valve member to yieldably maintain both valve members in closed position with respect to the port; and means on the second valve means engageable by the first valve means, upon movement of said first valve means in the aforesaid first direction, for effecting opening of said one valve member prior to and followed by opening of the other of the valve members.

WAYNE H. WORTHINGTON.
EMIL F. JIRSA.

REFERENCES CITED

The following references are of record in the file of this patent:

UNITED STATES PATENTS

| Number | Name | Date |
|---|---|---|
| 2,459,613 | Baker | Jan. 18, 1949 |